United States Patent
Izmailov et al.

(10) Patent No.: US 7,979,367 B2
(45) Date of Patent: Jul. 12, 2011

(54) GENERALIZED SEQUENTIAL MINIMAL OPTIMIZATION FOR SVM+ COMPUTATIONS

(75) Inventors: Rauf Izmailov, Plainsboro, NJ (US); Akshay Vashist, Plainsboro, NJ (US); Vladimir Vapnik, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 792 days.

(21) Appl. No.: 12/046,061

(22) Filed: Mar. 11, 2008

(65) Prior Publication Data

US 2008/0243731 A1 Oct. 2, 2008

Related U.S. Application Data

(60) Provisional application No. 60/908,264, filed on Mar. 27, 2007.

(51) Int. Cl.
*G06E 1/00* (2006.01)
*G06E 3/00* (2006.01)
(52) U.S. Cl. .......... 706/16; 382/155; 382/181; 600/509
(58) Field of Classification Search ............... 706/16, 706/12
See application file for complete search history.

(56) References Cited

U.S. PATENT DOCUMENTS

2006/0074908 A1 4/2006 Selvaraj et al.
2006/0112026 A1 5/2006 Graf et al.
2009/0204553 A1* 8/2009 Gates ............................ 706/12

OTHER PUBLICATIONS

Boser et al., A Training Algorithm for Optimal Margin Classifiers; Proceedings of the Fifth Annual Workshop on Computational Learning Theory, vol. 5; 1992; pp. 144-152.

Cortes, et al., Support Vector Networks; Machine Learning; vol. 20; 1995; pp. 273-297.

Platt, Fast Training of Support Vector Machines Using Sequential Minimal Optimization; Advances in Kernel Methods—Support Vechtor Learning, B. Scholk pf, C. Burges and A. Smola, Eds; MIT Press; 1999; pp. 185-208.

John C. Platt et al 'Sequential Minimal Optimization: A Fast Algorithm for Training Support Vector Machines', Technical Report MSR-TR-98-14 Apr. 21, p. 1-21.

Jian-Pei Zhang et al. 'A paralled SVM training algorithm on large-scale classification problems' In: Proceedings of the Fourth International Conference on Machine Learning and Cybernetics, Guangzhou, Aug. 18-21, 2005, vol. 3, pp. 1637-1641, ISBN 0-7803-9091-1.

* cited by examiner

*Primary Examiner* — Omar F Fernandez Rivas
*Assistant Examiner* — Kalpana Bharadwaj
(74) *Attorney, Agent, or Firm* — James Bitetto; Joseph Kolodka

(57) ABSTRACT

A system and method for support vector machine plus (SVM+) computations include selecting a set of indexes for a target function to create a quadratic function depending on a number of variables, and reducing the number of variables to two in the quadratic function using linear constraints. An extreme point is computed for the quadratic function in closed form. A two-dimensional set is defined where the indexes determine whether a data point is in the two-dimensional set or not. A determination is made of whether the extreme point belongs to the two-dimensional set. If the extreme point belongs to the two-dimensional set, the extreme point defines a maximum and defines a new set of parameters for a next iteration. Otherwise, the quadratic function is restricted on at least one boundary of the two-dimensional set to create a one-dimensional quadratic function. The steps are repeated until the maximum is determined.

14 Claims, 8 Drawing Sheets

GENERALIZED SEQUENTIAL MINIMAL OPTIMIZATION FOR SVM+ COMPUTATIONS

RELATED APPLICATION INFORMATION

This application claims priority to provisional application Ser. No. 60/908,264 filed on Mar. 27, 2007, incorporated herein by reference.

BACKGROUND

1. Technical Field

The present invention relates to support vector machines for machine learning and more particularly to a generalized Sequential Minimum Optimization (SMO) system and method for solving the support vector machine optimization problem.

2. Description of the Related Art

Support vector machines (SVMs) are a set of related supervised learning methods used for classification and regression. SVMs belong to a family of generalized linear classifiers. A special property of SVMs is that they simultaneously minimize empirical classification error and maximize geometric margin; hence they are also known as maximum margin classifiers.

Support vector machines map input vectors to a higher dimensional space where a maximal separating hyperplane is constructed. Two parallel hyperplanes are constructed on each side of the hyperplane that separates the data. The separating hyperplane is the hyperplane that maximizes the distance between the two parallel hyperplanes. An assumption is made that the larger the margin or distance between these parallel hyperplanes the better the generalization error of the classifier will be.

Data is classified as a part of a machine-learning process. Each data point is represented by a p-dimensional vector (a list of p numbers). Each of these data points belongs to only one of two classes. We are interested in whether we can separate them with a "p minus 1" dimensional hyperplane. This is a typical form of a linear classifier. There are many linear classifiers that might satisfy this property. However, we are additionally interested in finding out if we can achieve maximum separation (margin) between the two classes. By this we mean that we pick the hyperplane so that the distance from the hyperplane to the nearest data point is maximized. That is to say that the nearest distance between a point in one separated hyperplane and a point in the other separated hyperplane is maximized. Now, if such a hyperplane exists, it is clearly of interest and is known as the maximum-margin hyperplane and such a linear classifier is known as a maximum margin classifier.

Recently, a generalization of a support vector machine (SVM) technique, called support vector machine plus (SVM+), was proposed by V. Vapnik, in *Estimation of Dependences Based on Empirical Data: Empirical Inference Science*, Springer, 2006. The SVM+ approach is designed to take advantage of structure in training data (for example, noise present in data, or invariants in the data). By leveraging this structure, the SVM+ technique can have a better generalization by lowering the overall system's VC-dimension.

While multiple methods for training SVM have been proposed (the leading one being Sequential Minimum Optimization (SMO)), there are no available methods for training SVM+.

SVM and Its Computation Using SMO: In 1995, the SVM method for constructing an optimal hyperplane for non-separable data was introduced (see C. Cortes, V. Vapnik, "Support vector networks," *Machine Learning*, vol. 20, pp. 273-297, 1995. The method deals with the following problem.

Given training data: $(\vec{x}_1, y_1), \ldots, (\vec{x}_l, y_l)$ $y \in \{-1, 1\}$, $\vec{x} \in \mathbb{R}^n$, find the parameters $\vec{w}$ and b of the hyperplane $(\vec{w}, \vec{x}) + b = 0$ that separate the data $\{(\vec{x}_1, y_1), \ldots, (\vec{x}_l, y_l)\}$ (perhaps, with some errors) and minimize the functional:

$$R = (\vec{w}, \vec{w}) + C \sum_{i=1}^{\ell} \xi_i, i = 1, \ldots, \ell$$

under the constraints: $y_i[(\vec{w}, \vec{x}_i) + b] \geq 1 - \xi_i$, $\xi_i \geq 0$, $i = 1, \ldots, 1$.

Here slack variables $\xi_i$ characterize the values of training errors, while C' is the penalty of these errors in the functional. Using standard techniques, this problem can be converted to the dual form, which would then require minimizing the functional;

$$W = \sum_{i=1}^{\ell} \alpha_i - \frac{1}{2} \sum_{i,j=1}^{\ell} y_i y_j \alpha_i \alpha_j (\vec{x}_i, \vec{x}_j)$$

over parameters $\alpha_i$ (Lagrange multipliers), subject to the constraints:

$$\sum_{i=1}^{\ell} y_i \alpha_i = 0, 0 \leq \alpha_i \leq C.$$

The desired separating hyperplane has the form $$\sum_{i=1}^{\ell} y_i \alpha_i (\vec{x}_i, \vec{x}) + b = 0$$

where parameters $\alpha_1, \ldots, \alpha_l$ and b are the solution of the above optimization problem.

Generally, one cannot expect that the data $\{(\vec{x}_1, y_1), \ldots, (\vec{x}_l, y_l)\}$ can be separated by a linear function (hyperplane). Thus, B. Baser, I. Guyon, V. Vapnik, "A Training Algorithm for Optimal Margin Classifiers," in *Proceedings of the Fifth Annual Workshop on Computational Learning Theory*, Vol. 5, pp. 144-152, 1992, it was shown how the so-called "kernel trick" can be used for constructing wide classes of nonlinear separating functions. To employ the kernel trick, one maps input vectors $\vec{x} \in X$ (original feature space) into vectors $\vec{z} \in Z$ (new feature space, image space), where one constructs the separating hyperplane $$\sum_{i=1}^{\ell} y_i \alpha_i (\vec{z}_i, \vec{z}) + b = 0$$

with parameters $\alpha_1, \ldots, \alpha_l$ and b that maximize the functional subject to the constraints $$\begin{cases} \sum_{i=1}^{\ell} y_i \alpha_i = 0, \\ 0 \leq \alpha_i \leq C. \end{cases}$$

According to the Mercer's theorem (as explained in Boser et al.), for any inner product $(\vec{z}_i, \vec{z}_j)$ in the image space Z there exists a positive definite function $K(\vec{x}_i, \vec{x}_j)$ in space X such that $(\vec{z}_i, \vec{z}_j) = K(\vec{x}_i, \vec{x}_j)$, i, j=1, ..., l.

Conversely, for any positive definite function $K(\vec{x}_i, \vec{x}_j)$ in the space X, there exists such a space Z that $K(\vec{x}_i, \vec{x}_j)$ forms an inner product $(\vec{z}_i, \vec{z}_j)$ in space Z. Therefore, to construct a nonlinear separating function $$\sum_{i=1}^{\ell} y_i \alpha_i K(\vec{x}_i, \vec{x}) + b = 0$$

in the image space Z, one has to maximize the functional:

$$W = \sum_{i=1}^{\ell} \alpha_i - \frac{1}{2} \sum_{i,j=1}^{\ell} y_i y_j \alpha_i \alpha_j K(\vec{x}_i, \vec{x}_j)$$

subject to the constraints:

$$\begin{cases} \sum_{i=1}^{\ell} y_i \alpha_i = 0, \\ 0 \le \alpha_i \le C. \end{cases}$$

This problem is a special form of a quadratic optimization problem, where the constraints consist of one equality constraint and l box constraints. As it was demonstrated in the past, the problem can be solved much more efficiently than a general quadratic programming problem (see details in D. Bertsekas, *Convex Analysis and Optimization*, Athena Scientific, 2003).

J. Platt, in "Fast Training of Support Vector Machines using Sequential Minimal Optimization," in *Advances in Kernel Methods—Support Vector Learning*, B. Schölkopf, C. Burges, and A. Smola, eds., pp. 185-208, MIT Press, 1999, proposed one of the most efficient algorithms for solving this problem, the so-called sequential minimal optimization (SMO) algorithm. The idea was to solve the optimization problem by sequentially, in each step selecting a pair of Lagrange multipliers $\alpha_i$, $\alpha_j$ and maximizing the functional over them while keeping the rest of Lagrange multipliers fixed. The resulting two-dimensional optimization problem has a closed-form solution, which can be found extremely fast. By choosing appropriate pairs of Lagrange multipliers for each step for sequentially maximizing the functional, the SMO algorithm finds the desired solution quickly. This SMO algorithm made the SVM method extremely efficient for problems involving large amount of data in high-dimensional spaces.

SVM+ as an Extension of SVM: In the book, V. Vapnik, *Estimation of Dependences Based on Empirical Data: Empirical Inference Science*, Springer, 2006, and technical report, V. Vapnik, M. Miller, "SVM+: A new learning machine that considers the global structure of the data," NECLA TR 2005-L141, 2005, a generalization of the SVM method of constructing separating functions, the so-called SVM+ method, was introduced. The idea of the generalization is the following. Consider the slack variables $\xi_i$ in the form $\xi_i = \psi(\vec{x}_i, \delta)$, $\delta \in D$, where $\psi(\vec{x}_i, \delta)$ belongs to some admissible set of functions (we call them correcting functions). In classical SVM slacks, $\xi_i$ can take arbitrary values. By introducing slacks that are a realization of one of the admissible functions, we try to reduce the overall VC dimension; improve the generalization quality of the decision rule; introduce a richer training environment: instead of an oracle (providing just +1 or −1 for classification $y_i$), we can exploit the teacher's input (providing hidden knowledge on classification errors $\xi_i$).

Note that extra hidden information is only used during training, not in actual testing. In SVM+, we map any input vector $\vec{x}$ into two different spaces: space $\vec{z} \in Z$ as in SVM method (called the space of decision functions $\xi_i$) and in another space $\vec{z} \in Z^+$ (called the space of correcting functions) defining our admissible set of functions as follows: $\psi(\vec{x}, \delta) = (\vec{w}, \vec{z}) + d$, where $\vec{w}^+ \in Z^+$ and $d \in \mathbb{R}^n$, Therefore, given the training data and two spaces Z and $Z^+$, we define triplets $(y_1, \vec{z}_1, \vec{z}_1^+), \ldots, (y_l, \vec{z}_l, \vec{z}_l^+)$.

Our goal is to construct the separating hyperplane $(\vec{w}, \vec{z}) + b = 0$, in the decision space Z subject to the constraints $$\begin{cases} y_i[(\vec{w}, \vec{z}_i) + b] \ge 1 - ((\vec{w}^+, \vec{z}_i^+) + d) \\ (\vec{w}^+, \vec{z}_i^+) + d \ge 0 \end{cases}$$

that minimizes the functional $$R = C \sum_{i=1}^{\ell} ((\vec{w}^+, \vec{z}_i^+) + d) + (\vec{w}, \vec{w}) + \gamma(\vec{w}^+, \vec{w}^+).$$

The dual form solution to this problem is to maximize the functional $$W = \sum_{i=1}^{\ell} \alpha_i - \frac{1}{2} \sum_{i,j=1}^{\ell} y_i y_j \alpha_i \alpha_j (\vec{z}_i, \vec{z}_j) -$$

$$\frac{1}{2\gamma} \sum_{i,j=1}^{\ell} (\alpha_i + \beta_i - C)(\alpha_j + \beta_j - C)(\vec{z}_i^+, \vec{z}_j^+)$$

subject to the constraints:

$$\begin{cases} \alpha_i \ge 0, \quad i = 1, \ldots, \ell \\ \beta_i \ge 0, \quad i = 1, \ldots, \ell \\ \sum_{i=1}^{\ell} y_i \alpha_i = 0 \\ \sum_{i=1}^{\ell} (\alpha_i + \beta_i - C) = 0 \end{cases}$$

The solution (over parameters $\alpha$, $\beta$, b, d) defines the separating function (in the decision space Z)

$$\sum_{i=1}^{\ell} y_i \alpha_i (\vec{z}_i, \vec{z}) + b = 0;$$

the correcting function has the form:

$$\psi(z) = \frac{1}{\gamma} \sum_{i=1}^{\ell} (\alpha_i + \beta_i - C)(\vec{z}_i^+, \vec{z}^+) + d.$$

Using the same kernel trick for two different spaces Z and $Z^+$ and denoting by $K(\vec{x}_i, \vec{x}_j)$ and $K^+(\vec{x}_i, \vec{x}_j)$ the corresponding kernels for these spaces (we can call them decision space kernel and correction space kernel), we can formulate the SVM+ problem as follows. Maximize the functional;

$$W = \sum_{i=1}^{\ell} \alpha_i - \frac{1}{2} \sum_{i,j=1}^{\ell} y_i y_j \alpha_i \alpha_j K(\vec{x}_i, \vec{x}_j) -$$

$$\frac{1}{2\gamma} \sum_{i,j=1}^{\ell} (\alpha_i + \beta_i - C)(\alpha_j + \beta_j - C) K^+(\vec{x}_i^+, \vec{x}_j^+)$$

subject to the constraints:

$$\begin{cases} \alpha_i \geq 0, & i = 1, \ldots, \ell \\ \beta_i \geq 0, & i = 1, \ldots, \ell \\ \sum_{i=1}^{\ell} y_i \alpha_i = 0 \\ \sum_{i=1}^{\ell} (\alpha_i + \beta_i - C) = 0 \end{cases}$$

The decision function for SVM+ has the form $$\sum_{i=1}^{\ell} y_i \alpha_i K(\vec{x}_i, \vec{x}) + b = 0;$$

the correcting function has a form $$\psi(z) = \frac{1}{\gamma} \sum_{i=1}^{\ell} (\alpha_i + \beta_i - C) K^+ (\vec{x}_i^+, \vec{x}^+) + d.$$

In V. Vapnik, *Estimation of Dependences Based on Empirical Data: Empirical Inference Science*, Springer, 2006, a new setting of the learning problem was introduced (we call it learning hidden information), where for the training stage one is given triplets: $(y_1, \vec{x}_1, \vec{x}_1^+), \ldots, (y_\ell, x_\ell, \vec{x}_\ell^+)$, $y \in \{-1, 1\}$, $\vec{x} \in \mathbb{R}^n, \vec{x}^+ \in \mathbb{R}^n$, It is required to construct a decision rule $y = f(\vec{x})$ that partitions the data $\{\vec{x}_1, \ldots, \vec{x}_\ell\}$ into two categories. Vector $\vec{x}^+$ can be considered as a hint: it is available only for the training stage, and it will be hidden for the test stage. The problem of learning using hidden information can be solved using the SVM+ method where the vector $\vec{x}$ is mapped into space Z and the vector $\vec{x}^+$ is mapped into the space $Z^+$. In order to construct a decision rule, SVM+ takes into account hidden information.

SUMMARY

A system and method for support vector machine plus (SVM+) computations include selecting a set of indexes for a target function to create a quadratic function depending on a number of variables, and reducing the number of variables to two in the quadratic function using linear constraints. An extreme point is computed for the quadratic function in closed form. A two-dimensional set is defined where the indexes determine whether a data point is in the two-dimensional set or not. A determination is made of whether the extreme point belongs to the two-dimensional set. If the extreme point belongs to the two-dimensional set, the extreme point defines a maximum and defines a new set of parameters for a next iteration. Otherwise, the quadratic function is restricted on at least one boundary of the two-dimensional set to create a one-dimensional quadratic function. The steps are repeated until the maximum is determined.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
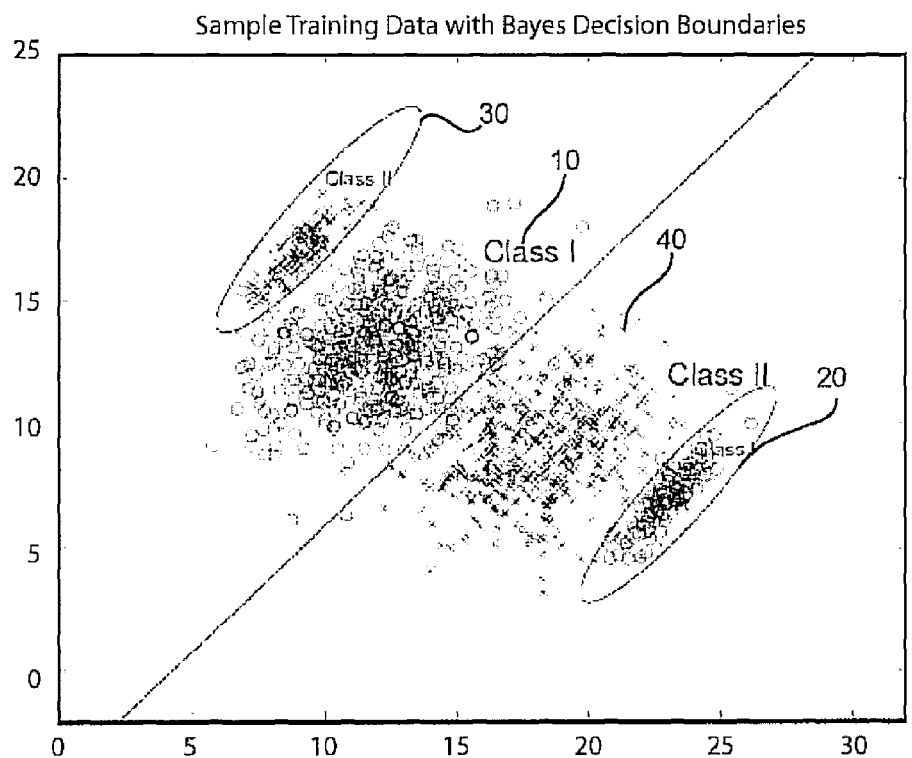
FIG. 1 is a plot of sample training data with Bayes decision boundaries.

The present principles provide a new generalized minimal sequential optimization (gSMO) method for fast training of SVM+. Although SVM+ has twice as many variables as SVM, the gSMO methods in accordance with the present principles are of the same level of complexity as a classical sequential minimal optimization (SMO) approach, which is the most efficient method developed for SVM thus far. gSMO can be also fine-tuned for specialized kernels in SVM+ while retaining its complexity level.

SVM+ is an extension of the standard SVM technique designed to take advantage of structures in the training data (for example, the noise present in the data, or invariants in the data). By leveraging these structures, the SVM+ technique can provide a basis for better generalization by lowering the overall system's VC-dimension.

In computational learning theory, the VC dimension (for Vapnik-Chervonenkis dimension) is a measure of the capacity of a statistical classification algorithm, defined as the cardinality of the largest set of points that the algorithm can shatter. Informally, the capacity of a classification model is related to how complicated it can be.

SVM+ also has a potential of new settings in pattern recognition: instead of traditional oracle-like teachers (providing simple classification for training data), it expands the role of a real teacher that can provide additional hints and hidden information during the training process. Performance advantages of SVM+ over SVM are provided, which are reflected in both improved classification accuracy and a reduced number of support vectors, on synthetic Gaussian data samples: a marginal error rate of SVM+ (above the Bayesian optimal rate) was shown to be about two times less than that of classical SVM.

A new generalized minimal sequential optimization optimization (gSMO) method of fast training of SVM+ is described. Although SVM+ has twice as many variables as SVM, the proposed gSMO method is of the same level of complexity as the classical sequential minimal optimization (SMO) approach (the most efficient algorithm developed for SVM so far). gSMO can be also fine-tuned for specialized kernels in SVM+ while retaining its complexity level.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

Referring now to the drawings in which like numerals represent the same or similar elements and initially to FIG. 1, sample training data is shown to illustrate concepts in accordance with the present principles.

Performance of SVM+: Simulations. Using standard techniques of quadratic programming, we conducted simulations for the following 2-dimensional problem. The problem has two classes (class I and class II), where each class has a Gaussian distribution. Each class is also further subdivided into two subclasses 10, 20 and 30, 40, respectively, including 80% and 20% of the sample, as shown in FIG. 1. An optimal Bayesian error rate was computed for the problem on a sample of size 100,000. This error rate was found to be 3.9%.

Figure 2:
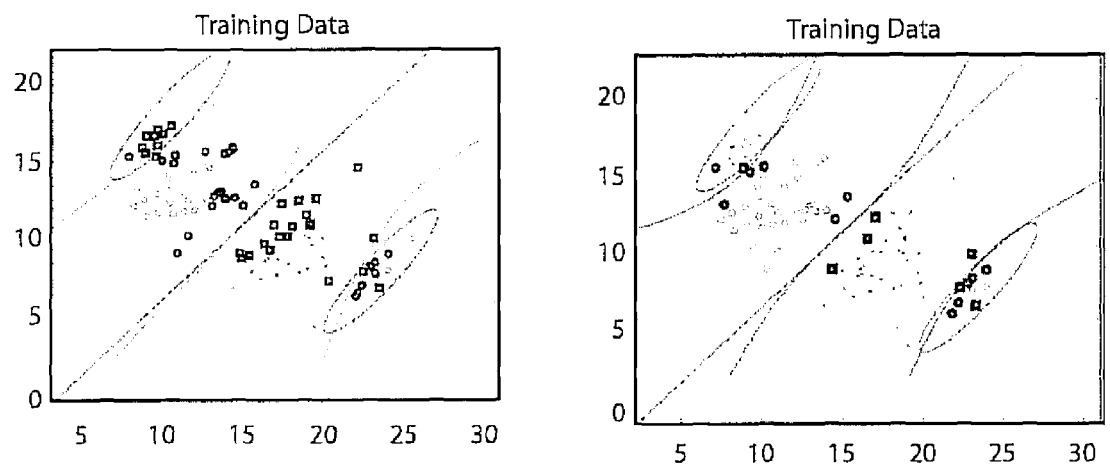
FIG. 2 shows performance plots comparing SVM (left plot) with SVM+ (right plot)

Using this error rate as a baseline, we compared solutions given by SVM (with radial basis kernels in the space) and SVM+ (with two radial basis kernels in the spaces 42 and 44). FIG. 2 shows a Bayesian decision rule as well as performance of classical SVM (46) and SVM+ (48), respectively.

Optimal parameters were selected using a validation set which was different from the training and the test. As results illustrate, SVM+ achieves the error rate 4.3%, while SVM's error rate is 4.8%. Thus, the deviation 0.4% of SVM+ from the Bayesian error rate is half of that of SVM (which is 0.9%). Also, SVM+ needs only 18 support vectors versus 59 support vectors for SVM. The difference in performance is due in part to the fact that the parameters can take more values.

Although the computation time on these samples (both of size 100) took less than a minute, generic quadratic programming approaches cannot be used efficiently for larger samples in multi-dimensional cases. We describe herein a generalized SMO method (gSMO) that can solve SVM+ as efficiently as SMO can solve SVM.

Generalized Sequential Minimal Optimization in accordance with the present principles (gSMO) follows, in general the structure of SMO. As SMO, gSMO is a sequential process of maximizing a target function. At each of the steps of this sequential process, a pair (working set) of indexes i and j is selected. The function then becomes a quadratic function depending on four variables: $\alpha_i$, $\alpha_j$, $\beta_i$ and $\beta_j$. Linear constraints reduce the number of variables to two: $\alpha_j$ and $\beta_j$. An extreme point $(\alpha_j^+, \beta_j^+)$ of the restricted 2-dimensional quadratic function W is then computed in a closed form. Also, linear constraints are used to define the 2-dimensional set D (which turns out to be either a rectangle or a triangle, depending on whether indexes i and j correspond to two data points $\vec{x}_i$ and $\vec{x}_j$ belonging to the same classification class or not; in other words, whether $y_i y_j$ is equal to +1 or −1. If the extreme point $(\alpha_j^+, \beta_j^+)$ belongs to D, it delivers the maximum and defines a new set of parameters (Lagrange multipliers); otherwise, the function W is further restricted on one or two of the corresponding boundaries of D (where it becomes a 1-dimensional quadratic function), where extreme points are again calculated in a closed form and compared to select the one that delivers the largest value for W—it is then selected for the new set of parameters (Lagrange multipliers).

We apply this gSMO reasoning to two cases of correction space kernels $K^+$: a general correction space kernel and a diagonal correction space kernel. While the first case follows the outline of gSMO, the second one is amenable to further simplifications stemming from a special structure of the correction space kernel.

Case of a General Correction Space Kernel: Consider the case of a general correction space kernel $K^+$. In this case, the optimization problem has the following form. Maximize:

$$W(\vec{\alpha}, \vec{\beta}) = \sum_{i=1}^{\ell} \alpha_i - \frac{1}{2} \sum_{i=1}^{\ell} \sum_{j=1}^{\ell} y_i y_j K(\vec{x}_i, \vec{x}_j) \alpha_i \alpha_j -$$

$$\frac{1}{2\gamma} \sum_{i=1}^{\ell} \sum_{j=1}^{\ell} K^+(\vec{x}_i^+, \vec{x}_j^+)(\alpha_i + \beta_i - C)(\alpha_j + \beta_j - C)$$

under the constraints:

$$\begin{cases} y_\ell = \pm 1, \\ \sum_{i=1}^{\ell} y_i \alpha_i = 0, \\ 0 \le \alpha_i \text{ for all } i = 1, \ldots, \ell \\ 0 \le \beta_i \text{ for all } i = 1, \ldots, \ell, \end{cases}$$

and the additional constraint:

$$\sum_{i=1}^{\ell} (\alpha_i + \beta_i - C) = 0.$$

For maximizing our objective function we focus on the smallest possible subproblem involving two examples, say, i and j and focus on maximizing $W(\alpha_i, \alpha_j, \beta_i, \beta_j)$ part of the objective function that depends on the Lagrange multipliers corresponding to selected examples. Then, the function has the form:

$$W(\alpha_i, \alpha_j, \beta_i, \beta_j) = W^+(\alpha_i, \alpha_j) + W^+(\alpha_i, \alpha_j, \beta_i, \beta_j), \text{ where}$$

$$W^+(\alpha_i, \alpha_j) =$$

$$\alpha_i + \alpha_j - \frac{1}{2}[K_{ii}\alpha_i^2 + K_{jj}\alpha_j^2 + 2sK_{ij}\alpha_i\alpha_j + 2v_i\alpha_i + 2v_j\alpha_j] + W_{constant}$$

is the same function as in the SMO method, and $$W^+(\alpha_i, \alpha_j, \beta_i, \beta_j) =$$

$$-\frac{1}{2\gamma}[K_{ii}^+(\alpha_i + \beta_i - C)^2 + K_{jj}^+(\alpha_j + \beta_j - C)^2 + 2K_{ij}^+(\alpha_i + \beta_i - C)$$

$$(\alpha_j + \beta_j - C) + 2v_i^+(\alpha_i + \beta_i - C) + 2v_j^+(\alpha_i + \alpha_j - C)] + W_{constant}^+$$

is the additional function corresponding to the SVM+ case. Here:

$$s = y_i y_j = \pm 1$$

$$K_{mn} = K(\vec{x}_m, \vec{x}_n), K_{mn}^+ = K^+(\vec{x}_m, \vec{x}_n) \text{ for all } m, n$$

$$v_i = y_i \sum_{\substack{m=1 \\ m \neq i,j}}^{\ell} y_m K_{im} \alpha_m, \quad v_j = y_j \sum_{\substack{m=1 \\ m \neq i,j}}^{\ell} y_m K_{jm} \alpha_m,$$

$$v_i^+ = \sum_{\substack{m=1 \\ m \neq i,j}}^{\ell} K_{im}^+(\alpha_m + \beta_m - C), \quad v_j^+ = \sum_{\substack{m=1 \\ m \neq i,j}}^{\ell} K_{jm}^+(\alpha_m + \beta_m - C),$$

and the terms $W_{constant}$ and $W_{constant}^+$ do not depend on $\alpha_i, \alpha_j, \beta_i$ and $\beta_j$. Due to the first linear constraint involving $\alpha$'s, we can write $\alpha_i = \Delta - s\alpha_j$. Similarly the second linear constraint involving $\alpha$'s and $\beta$'s yields $(\alpha_i + \beta_i - C) = \mu - (\alpha_j + \beta_j - C)$.

Using these substitutions the objective function takes the form:

$$W(\alpha_j, \beta_j) = W^+(\alpha_j) + W^+(\alpha_j, \beta_j), \text{ where}$$

$$W^+(\alpha_j) =$$

$$-\frac{1}{2}[K_{ii}(\Delta - s\alpha_j)^2 + K_{jj}\alpha_j^2 + 2sK_{ij}(\Delta - s\alpha_j)\alpha_j + 2(\Delta - s\alpha_j)v_i + 2\alpha_j v_j] +$$

$$\Delta + (1-s)\alpha_j + W_{constant},$$

and $$W^+(\alpha_j, \beta_j) = -\frac{1}{2\gamma}[K_{ii}^+(\mu - \alpha_j - \beta_j + C)^2 +$$

$$K_{jj}^+(\alpha_j + \beta_j - C)^2 2K_{ij}^+(\mu - \alpha_j - \beta_j + C)(\alpha_j + \beta_j - C) +$$

$$2v_i^+(\mu - \alpha_j - \beta_j + C) + 2v_j^+(\alpha_j + \beta_j - C)] + W_{constant}^+$$

Then, function $W(\alpha_j, \beta_j)$ can be written as:

$$W(\alpha_j, \beta_j) =$$

$$-\frac{1}{2}[K_{ii}(\Delta - s\alpha_j)^2 + K_{jj}\alpha_j^2 + 2sK_{ij}(\Delta - s\alpha_j)\alpha_j + 2(\Delta - s\alpha_j)v_i + 2\alpha_j v_j] +$$

$$\Delta + (1-s)\alpha_j - \frac{1}{2\gamma}[K_{jj}^+(\alpha_j + \beta_j - C)^2 +$$

$$K_{ii}^+(\mu - \alpha_j - \beta_j + C)^2 + 2K_{ij}^+(\mu - \alpha_j - \beta_j + C)(\alpha_j + \beta_j - C) +$$

$$2v_i^+(\mu - \alpha_j - \beta_j + C) + 2v_j^+(\alpha_j + \beta_j - C)] + W_{constant}$$

The function $W(\alpha_j, \beta_j)$ has zero derivatives on $\alpha_j$ and $\beta_j$ for $$\begin{cases} \alpha_j^+ = \dfrac{1 - s + s\Delta(K_{ii} - K_{ij}) + sv_i - v_j}{K_{ii} - 2K_{ij} + K_{jj}} \\ \beta_j^+ = C - \alpha_j^+ + \dfrac{\mu(K_{ii}^+ - K_{ij}^+) + v_i^+ - v_j^+}{K_{ii}^+ - 2K_{ij}^+ + K_{jj}^+} \end{cases}$$

Note that the extreme point $(\alpha_j^+, \beta_j^+)$ does not depend on $\gamma$. The new extreme point can be expressed in terms of old values of $\alpha_j$ and $\beta_j$ by using the gradient of the objective function. Let $G_i$ denote the gradient of $W^+()$ and $g_i$ denote the gradient of $W^+()$ without the factor $\gamma$, i.e., $$G_i = 1 - y_i \sum_{m=1}^{\ell} y_m \alpha_m K_{im} \quad G_j = 1 - y_j \sum_{m=1}^{\ell} y_m \alpha_m K_{jm}$$

$$g_i = -\sum_{m=1}^{\ell}(\alpha_m + \beta_m - C)K_{im}^+ \quad g_j = -\sum_{m=1}^{\ell}(\alpha_m + \beta_m - C)K_{jm}^+$$

then we can rewrite $v_i, v_j, v_i^+$ and $v_j^+$ as:

$$v_i = 1 - G_i - \alpha_i K_{ii} - s\alpha_j K_{ij},$$

$$v_j = 1 - G_j - \alpha_j K_{jj} - s\alpha_i K_{ij},$$

$$v_i^+ = -g_i - (\alpha_i + \beta_i - C)K_{ii}^+ - (\alpha_j + \beta_j - C)K_{ij}^+$$

$$v_j^+ = -g_j - (\alpha_j + \beta_j - C)K_{jj}^+ - (\alpha_i + \beta_i - C)K_{ij}^+$$

So, $$sv_i - v_j = s - 1 - sG_i + G_j + \alpha_j(K_{ii} - 2K_{ij} + K_{jj}) + s\Delta(K_{ij} - K_{ii})$$

$$v_i^+ - v_j^+ = g_j - g_i + (\alpha_j + \beta_j - C)(K_{ii}^+ - 2K_{ij}^+ + K_{jj}^+) + \mu(K_{ij}^+ - K_{ii}^+)$$

Note that the above expressions are computed using the old values of $\alpha_j$ and $\beta_j$, in other words, the values at the beginning of the current iteration. Using the above expressions for $sv_i - v_j$ and $v_i^+ - v_j^+$ we can represent $\alpha_j^+$ and $\beta_j^+$ in terms their old values as follows:

$$\begin{cases} \alpha_j^+ = \alpha_j^{old} + \dfrac{G_j - sG_i}{K_{ii} - 2K_{ij} + K_{jj}} \\ \beta_j^+ = \alpha_j^{old} + \beta_j^{old} - \alpha_j^+ + \dfrac{g_j - g_i}{K_{ii}^+ - 2K_{ij}^+ + K_{jj}^+} \end{cases}$$

Now that we have calculated the extreme point $(\alpha_j, \beta_j)$, to maximize the function $W(\alpha_j, \beta_j)$ on the 2-dimensional space $\{\alpha_j, \beta_j\}$, we need to find the feasible domain D where the following four constraints (stemming from non-negativity of all variables $\alpha$ and $\beta$) of the problem hold:

$$\begin{cases} \alpha_j \geq 0 \\ \alpha_i = \Delta - \alpha_j s \geq 0 \\ \beta_j \geq 0 \\ \beta_i = \mu - (\Delta - \alpha_j s - C) - (\alpha_j + \beta_j - C) \geq 0 \end{cases}$$

We consider two cases $s=+1$ and $s=-1$ separately.

Case 1: $s=+1$. In this case, the constraints describing the domain D have the form $$\begin{cases} 0 \leq \alpha_j \leq \Delta \\ 0 \leq \beta_j \leq \mu - \Delta + 2C. \end{cases}$$

Figure 3:
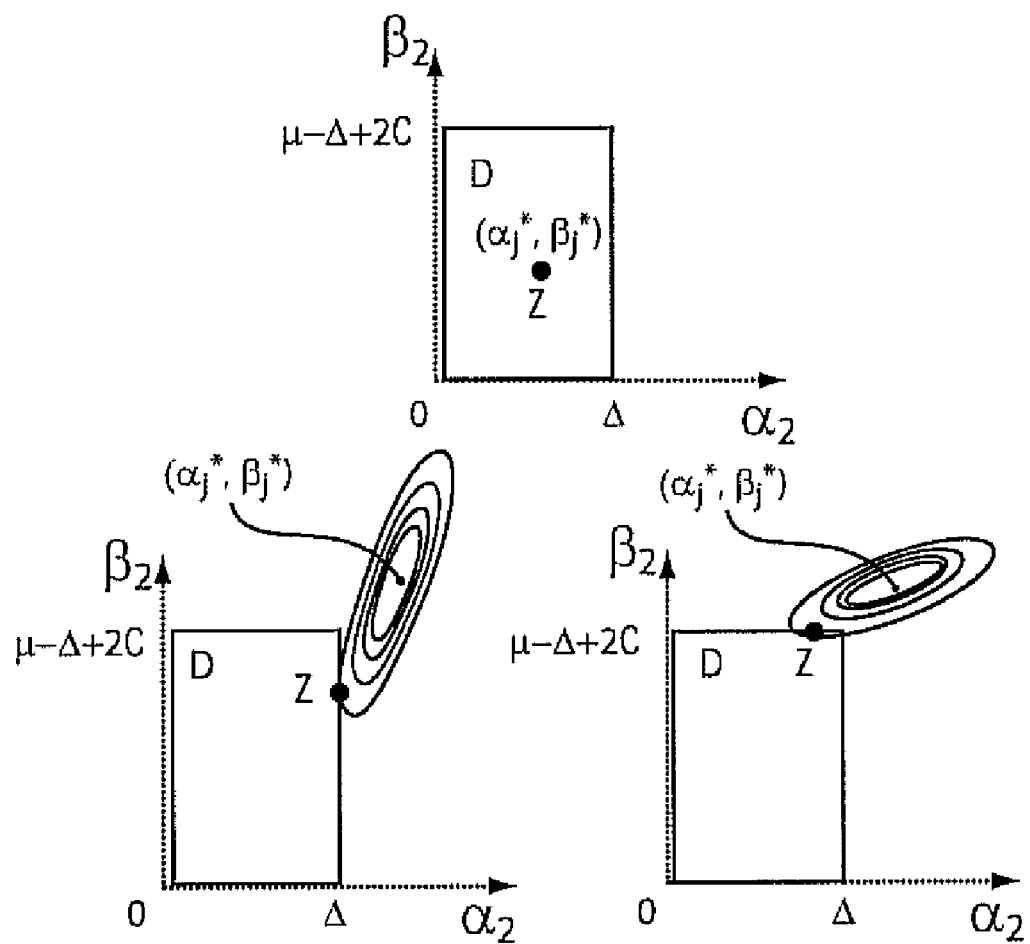
FIG. 3 shows permissible domains for determining a maximum of an extreme point in accordance with a case where s=+1.

Observe that the domain D is non-empty, because $\Delta \geq 0$ and $\mu - \Delta + 2C \geq 0$. Indeed, since $s=1$, then $\Delta = \alpha_i + \alpha_j \geq 0$. Also, $\beta_i + \beta_j = \mu - (\alpha_i + \alpha_j) + 2C = \mu - \Delta + 2C \geq 0$. The domain D is shown in FIG. 3.

If the inequalities $$\begin{cases} 0 \le \alpha_j^+ \le \Delta \\ 0 \le \beta_j^+ \le \mu - \Delta + 2C \end{cases}$$

hold, then the extreme point $(\alpha_j^+, \beta_j^+)$ belongs to D (as shown in the upper part of FIG. 5), and it is the maximum point of the function $W(\alpha_j, \beta_j)$. Otherwise, if these inequalities do not hold for $(\alpha_j^+, \beta_j^+)$, then the maximum point of the function $W(\alpha_j, \beta_j)$ belongs to one of the four boundaries of D, as illustrated in the lower part of FIG. 5. We now consider each of the four boundaries of D separately and execute the following operations for each of them: 1) Restrict the function $W(\alpha_j, \beta_j)$ on the corresponding boundary. The result would be a quadratic function of a single argument $\alpha_j$ or $\beta_j$ (depending on whether the boundary is vertical or horizontal). 2) Maximize the restricted function $W(\alpha_j, \beta_j)$ on the corresponding boundary. That would have to find the extreme point (by differentiation) and also calculating the function at the two ends of the segment (the ends of the segment are the corresponding vertices of D.

For the following cases, we need to consider the function $W(\alpha_j, \beta_j)$ restricted to a horizontal or a vertical line. On the horizontal boundaries of the domain, $\beta_j$ is constant, say $\beta_j = b$, reducing the objective function to $W(\alpha_j, b) = W(\alpha_j)$, while for the vertical boundaries, $\alpha_j$ is constant, say $\alpha_j = \alpha$, and the objective function reduces to $W(\alpha, \beta_j) = W(\alpha_j)$. On the horizontal line $W(\alpha_j)$ has a zero derivative for $\alpha_j|\beta_j = b$ (given below). Similarly, $W(\beta_j)$ on the vertical line has a zero derivative for $\beta_j|\alpha_j = \alpha$ expressed below:

$$\alpha_j^+|_{\beta_j=b} = \alpha_j^{old} + \frac{g_j - g_i + (\beta_j^{old} - b)(K_{ii}^+ - 2K_{ij}^+ + K_{jj}^+) + \gamma(G_j - G_i)}{(K_{ii}^+ - 2K_{ij}^+ + K_{jj}^+) + \gamma(K_{jj} - 2K_{ij} + K_{ii})}$$

$$\beta_j^+|_{\alpha_j=a} = \beta_j^{old} + \alpha_j^{old} - a + \frac{g_j - g_i}{(K_{ii}^+ - 2K_{ij}^+ + K_{jj}^+)}$$

Case 1.1: Lower boundary of D In this case, $\beta_j = 0$ and the restriction of the function $W(\alpha_j, \beta_j)$ on the lower boundary of D is a function of $\alpha_j$, where the ends of segments are determined by the coordinates $$(\alpha_j^{min} = 0, \beta_j^{min} = 0) \text{ and } (\alpha_j^{max} = \Delta, \beta_j^{max} = 0).$$

The function W has zero derivative on $\alpha_j$ for $\alpha_j^{1.1}$ that can be obtained by substituting s=1 and b=0 in $\alpha_j^+|\beta_j=b$, i.e., $$\alpha_j^{1.1} = \alpha_j^{old} + \frac{g_j - g_i + \beta_j^{old}(K_{ii}^+ - 2K_{ij}^+ + K_{jj}^+) + \gamma(G_j - G_i)}{(K_{ii}^+ - 2K_{ij}^+ + K_{jj}^+) + \gamma(K_{jj} - 2K_{ij} + K_{ii})}$$

so the potential maximum point $Z^{1.1}$ of the function $W(\alpha_j, \beta_j)$ on the left boundary of D has the form $Z^{1.1} = \{\alpha_j \alpha_j^{1.1}, \beta_j = 0\}$. If $Z^{1.1}$ belongs to the segment determined by the points $$\{\alpha_j^{min} = 0, \beta_j^{min} = 0\} \text{ and } \{\alpha_j^{max} = \Delta, \beta_j^{max} = 0\},$$

we select $M^{1.1} = W(Z^{1.1})$ as the maximum value achievable for Case 1.1; otherwise we select $$M^{1.1} = \max\{W(\alpha_j^{min}, \beta_j^{min}), W(\alpha_j^{max}, \beta_j^{max})\}.$$

Case 1.2: Upper boundary of D. In this case $\beta_j = \mu - \Delta + 2C$, and the restriction of the function $W(\alpha_j, \beta_j)$ on the upper boundary of D is a function of $\alpha_j$, where the ends of segments are determined by the values $$\{\alpha_j^{min} = 0, \beta_j^{min} = \mu - \Delta + 2C\} \text{ and } \{\alpha_j^{max} = \Delta, \beta_j^{max} = \mu - \Delta + 2C\}.$$

The function W has zero derivative on $\alpha_j$ for $\alpha_j^{1.2}$ which can be obtained by substituting s=1 and b=$\mu-\Delta+2C$ in $\alpha_j^+|\beta_j=b$, i.e., $$\alpha_j^{1.2} = \alpha_j^{old} + \frac{g_j - g_i + (\beta_j^{old} - b)(K_{ii}^+ - 2K_{ij}^+ + K_{jj}^+) + \gamma(G_j - G_i)}{(K_{ii}^+ - 2K_{ij}^+ + K_{jj}^+) + \gamma(K_{jj} - 2K_{ij} + K_{ii})}$$

so the potential maximum point $Z^{1.2}$ of the function $W(\alpha_j, \beta_j)$ on the left boundary of D has the form $Z^{1.2} = \{\alpha_j = \alpha_i^{1.2}, \beta_j = \mu - \Delta + 2C\}$. If $Z^{1.2}$ belongs to the segment determined by the points $$\{\alpha_j^{min} = 0, \beta_j^{min} = \mu - \Delta + 2C\} \text{ and } \{\alpha_j^{max} = \Delta, \beta_j^{max} = \mu - \Delta + 2C\},$$

we select $M^{1.2} = W(Z^{1.2})$ as the maximum value achievable for Case 1.2; otherwise we select $$M^{1.2} = \max\{W(\alpha_j^{min}, \beta_j^{min}), W(\alpha_j^{max}, \beta_j^{max})\}.$$

Case 1.3: Left boundary of D. In this case, $\alpha_j = 0$ and the restriction of the function $W(\alpha_j, \beta_j)$ on the upper boundary of D is a function of $\beta_j$, where the ends of the segment are determined by the values $$\{\alpha_j^{min} = 0, \beta_i^{min} = 0\} \text{ and } \{\alpha_i^{max} = 0, \beta_i^{max} = \mu - \Delta + 2C\}.$$

The function W has zero derivative on $\beta_j$ for $\beta_j^{1.3}$ which can be obtained by substituting s=1 and $\alpha=0$ in $\beta_j^+|\alpha_j=\alpha$, i.e., $$\beta_j^{1.3} = \beta_j^{old} + \alpha_j^{old} + \frac{g_j - g_i}{(K_{ii}^+ - 2K_{ij}^+ + K_{jj}^+)}$$

so the potential maximum point $Z^{1.3}$ of the function $W(\alpha_j, \beta_j)$ on the left boundary of D has the form $Z^{1.3} = \{\alpha_j = 0, \beta = \beta_j^{1.3}\}$. If $Z^{1.3}$ belongs to the segment determined by the points $$\{\alpha_j^{min} = 0, \beta_j^{min} = 0\} \text{ and } \{\alpha_i^{max} = 0, \beta_i^{max} = \mu - \Delta + 2C\},$$

we select $M^{1.3} = W(Z^{1.3})$ as the maximum value achievable for Case 1.3; otherwise we select $$M^{1.3} = \max\{W(\alpha_j^{min}, \beta_j^{min}), W(\alpha_j^{max}, \beta_j^{max})\}.$$

Case 1.4: Right boundary of D In this case, $\alpha_j=\Delta$ and the restriction of the function $W(\alpha_j,\beta_j)$ on the upper boundary of D is a function of $\beta_j$, where the ends of segments are determined by the values $$\{\alpha_i^{min} = \Delta, \beta_i^{min} = 0\} \text{ and } \{\alpha_j^{max} = \Delta, \beta_j^{max} = \mu - \Delta + 2C\}.$$

The function W has zero derivative on $\beta_j$ for $\beta_j^{1.4}$ which can be obtained by substituting s=1 and $\alpha=\Delta$ in $\beta_j^+|\alpha_j=\alpha$, i.e., $$\beta_j^{1.4} = \beta_j^{old} + \alpha_j^{old} - \Delta + \frac{g_j - g_i}{(K_{ii}^+ - 2K_{ij}^+ + K_{jj}^+)}$$

so the potential maximum point $Z^{1.4}$ of the function $W(\alpha_j, \beta_j)$ on the left boundary of D has the form $Z^{1.4}=\{\alpha_j=\Delta, \beta=\beta_j^{1.4}\}$. If $Z^{1.4}$ belongs to the segment determined by the points $$\{\alpha_i^{min} = \Delta, \beta_i^{min} = 0\} \text{ and } \{\alpha_j^{max} = \Delta, \beta_j^{max} = \mu - \Delta + 2C\},$$

we select $M^{1.4}=W(Z^{1.4})$ as the maximum value achievable for Case 1.4; otherwise we select $$M^{1.4} = \max\{W(\alpha_j^{min}, \beta_j^{min}), W(\alpha_j^{max}, \beta_j^{max})\}.$$

After all four cases (boundaries) are analyzed in this manner, we compare the four values $M^{1.1}$, $M^{1.2}$, $M^{1.3}$, $M^{1.4}$, and select the point $\{\alpha_j^+,\beta_j^+\}$ corresponding to the maximum one.

Case 2: s=−1. In this case, the constraints describing the domain D have the form $$\begin{cases} \alpha_j \geq L = \max(0, -\Delta) \\ \beta_j \geq 0 \\ 2\alpha_j + \beta_j \leq \mu - \Delta + 2C \end{cases}$$

We denote H=$(\mu-\Delta+2C)/2$; then $L\leq\alpha_j\leq H$ and $0\leq\beta_j\leq 2(H-L)$. Here we assume that $H\geq L$; if this condition does not hold, the method stops. The domain D is shown in FIG. 4.

Figure 4:
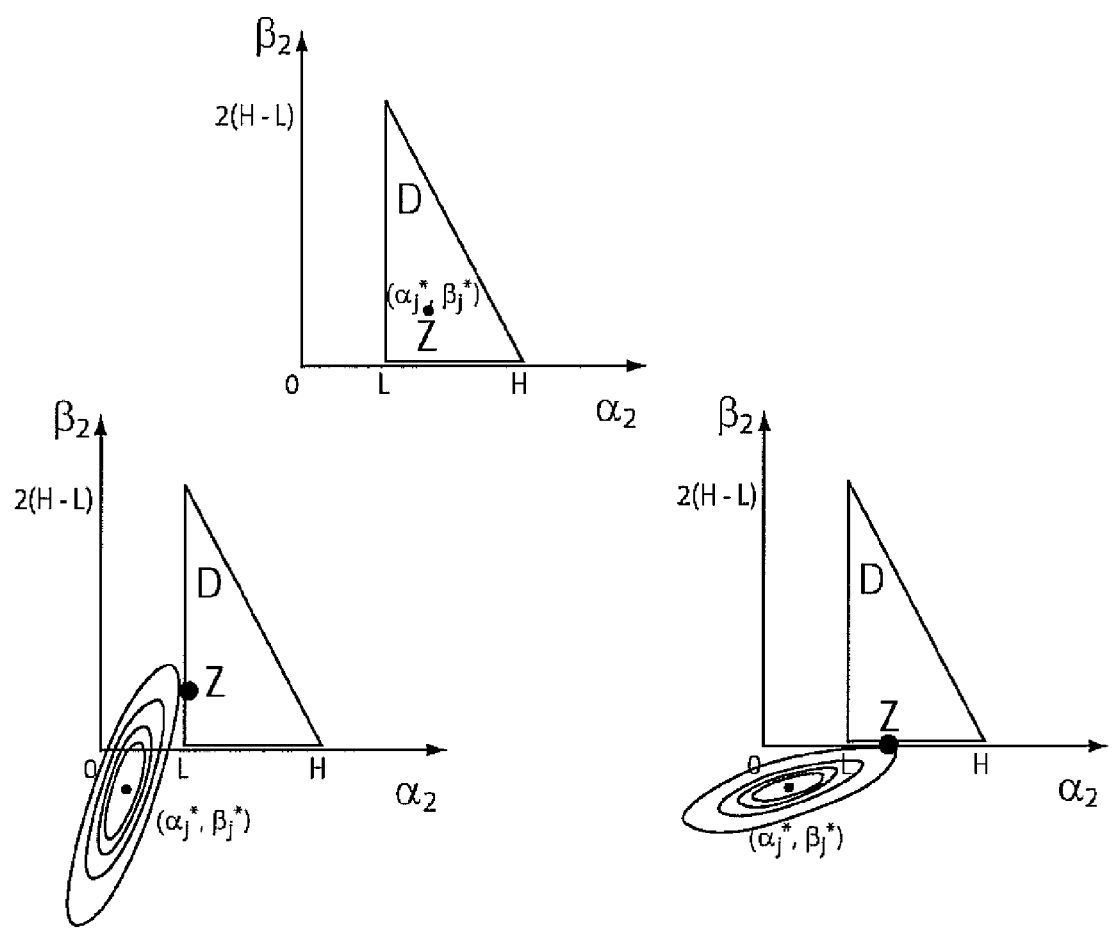
FIG. 4 shows permissible domains for determining a maximum of an extreme point in accordance with a case where s=−1.

If the inequalities $$\begin{cases} \alpha_j^+ \geq L = \max(0, -\Delta) \\ \beta_j^+ \geq 0 \\ 2\alpha_j^+ + \beta_j^+ \leq \mu - \Delta + 2C \end{cases}$$

hold, then the extreme point $(\alpha_j^+,\beta_j^+)$ belongs to D (as shown in the upper part of FIG. 4, and it is the maximum point Z of the function $W(\alpha_j,\beta_j)$. Otherwise, if these inequalities do not hold for $(\alpha_j^+,\beta_j^+)$, then the maximum point Z of the function $W(\alpha_j,\beta_j)$ belongs to one of three boundaries, as illustrated in the lower part of FIG. 5. We now consider each of the three boundaries separately and execute the following operations for each of them: 1) Restrict the function $W(\alpha_j,\beta_j)$ on the corresponding boundary. The result would be a quadratic function of a single argument (depending on whether the boundary is vertical, horizontal or sloped). 2) Maximize the restricted function $W(\alpha_j,\beta_j)$ on the corresponding boundary. That would need finding the extreme point (by differentiation) and also calculating the function in two ends of the segment (the ends of the segment are the corresponding vertices of D).

Case 2.1: Lower boundary of D. In this case, $\beta_j=0$ and the restriction of the function $W(\alpha_j,\beta_j)$ on the lower boundary of D is a function of $\alpha_j$, where the ends of segments are determined by the values $$\alpha_j^{min} = L \text{ and } \alpha_j^{max} = H.$$

The function W has zero derivative on $\alpha_j$ for $\alpha_j^{2.1}$ that can be obtained by substituting s=1 and b=0 in $\alpha_j^+|\beta_j=b$ i.e., $$\alpha_j^{2.1} = \frac{g_j - g_i + \beta_j^{old}(K_{ii}^+ - 2K_{ij}^+ + K_{jj}^+) + \gamma(G_j + G_i)}{(K_{ii}^+ - 2K_{ij}^+ + K_{jj}^+) + \gamma(K_{jj} - 2K_{ij} + K_{ii})}$$

so the potential maximum point $Z^{2.1}$ of the function $W(\alpha_j,\beta_j)$ on the lower boundary of D has the form $Z^{2.1}=\{\alpha_j\alpha_j^{2.1}, \beta_j=0\}$. If $Z^{2.1}$ belongs to the segment determined by the points $$\alpha_i^{min} = L \text{ and } \alpha_i^{max} = H,$$

we select $M^{2.1}=W(Z^{2.1})$ as the maximum value achievable for Case 2.1; otherwise we select $$M^{2.1} = \max\{W(\alpha_j^{min}, \beta_j^{min}), W(\alpha_j^{max}, \beta_j^{max})\}.$$

Case 2.2: Vertical boundary of D. In this case, $\alpha_j=L$ and the restriction of the function $W(\alpha_j,\beta_j)$ on the vertical boundary of D is a function of $\beta_j$, where the ends of segments are determined by the values $$\beta_j^{min} = 0 \text{ and } \beta_j^{max} = 2H - 2L.$$

The function W has zero derivative on $\beta_j$ for $\beta_j^{2.2}$ which can be obtained by substituting s=1 and $\alpha=L$ in $\beta_j^+|\alpha_j=\alpha$, i.e., $$\beta_j^{2.2} = \beta_j^{old} + \alpha_j^{old} - L + \frac{g_j - g_i}{K_{ii}^+ - 2K_{ij}^+ + K_{jj}^+}$$

so the potential maximum point $Z^{2.2}$ of the function $W(\alpha_j,\beta_j)$ on the lower boundary of D has the form $Z^{2.2}=\{\alpha_j=L, \beta_j=\beta_j^{2.2}\}$. If $Z^{2.2}$ belongs to the segment determined by the point $$\beta_j^{min} = 0 \text{ and } \beta_j^{max} = 2(H - L),$$

we select $M^{2.2}=W(Z^{2.2})$ as the maximum value achievable for Case 2.2; otherwise we select $$M^{2.2} = \max\{W(\alpha_j^{min}, \beta_j^{min}), W(\alpha_j^{max}, \beta_j^{max})\}.$$

Case 2.3: Slant boundary of D. In this case, $\beta_j=2H-2\alpha_j$ and the restriction of the function $W(\alpha_j,\beta_j)$ on the upper boundary of D is a function of $\alpha_j$, where the ends of segments are determined by the values $$\alpha_j^{min} = L \text{ and } \alpha_i^{max} = H,$$

The function W has zero derivative on $\alpha_j$ for $$\alpha_j^{2.3} = \alpha_j^{old} + \frac{\gamma(G_i + G_j) + \beta_i^{old}(K_{ii}^+ - 2K_{ij}^+ + K_{ii}^+) + g_i - g_j}{\gamma(K_{ii} - 2K_{ij} + K_{jj}) + (K_{ii}^+ - 2K_{ij}^+ + K_{jj}^+)}$$

so the potential maximum point $Z^{2.3}$ of the function $W(\alpha_j, \beta_j)$ on the lower boundary of D has the form $Z^{2.2} = \{\alpha_j = \alpha_j^{2.3}, \beta_j = 2H - 2\alpha_j^{2.3}\}$. If $Z^{2.3}$ belongs to the segment determined by the point $$\alpha_j^{min} = L \text{ and } \alpha_i^{max} = H,$$

we select $M^{2.3} = W(Z^{2.3})$ as the maximum value achievable for Case 2.3; otherwise we select $$M^{2.3} = \max\{W(\alpha_j^{min}, \beta_j^{min}), W(\alpha_j^{max}, \beta_j^{max})\}.$$

After all three cases (triangle boundaries) are analyzed in this manner, we compare the three values $M^{2.1}$, $M^{2.2}$, $M^{2.3}$, and select the point $\{\alpha_j^+, \beta_j^+\}$ corresponding to the maximum one.

Special Case of Identity Correction Space Kernel: Consider the case of an identity correction space kernel $K^+$, where $K^+(\vec{x}_i^+, \vec{x}_i^+) = 1$ for all $i = j$ and $K^+(\vec{x}_i^+, \vec{x}_j^+) = 0$ otherwise. In this case, the optimization problem has a simpler structure than in the general case, and can be solved by a more simple version of gSMO. The problem has the following form. Maximize:

$$W(\vec{\alpha}) = \sum_{i=1}^{l} \alpha_i - \frac{1}{2} \sum_{i=1}^{l} \sum_{j=1}^{l} y_i y_j K(\vec{x}_i, \vec{x}_j) \alpha_i \alpha_j - \frac{1}{2\gamma} \sum_{i=1}^{l} (\alpha_i + \beta_i - C)^2$$

under the constraints $$\begin{cases} y_i = \pm 1, \\ \sum_{i=1}^{l} y_i \alpha_i = 0, \\ 0 \leq \alpha_i \text{ for all } i = 1, \ldots, l, \\ 0 \leq \beta_i \text{ for all } i = 1, \ldots, l. \end{cases}$$

Select two of Lagrange multipliers $\alpha_i$ and $\alpha_j$. Then the function W has the form $W(\alpha_i, \alpha_j) = W^+(\alpha_i, \alpha_j) + W^+(\alpha_i, \alpha_j)$, where $$W^+(\alpha_i, \alpha_j) = \alpha_i + \alpha_j - \frac{1}{2}(K_{ii}\alpha_i^2 + K_{jj}\alpha_j^2 + 2sK_{ij}\alpha_i\alpha_j + \alpha_i v_i + \alpha_j v_j) + W_{constant}$$

is the same function as in Platt's SMO algorithm and $$W^+(\alpha_i, \alpha_j) = -\frac{1}{2\gamma}((\alpha_i + \beta_i - C)^2 + (\alpha_j + \beta_j - C)^2)$$

is the additional function corresponding to the SVM+ case.

Here, $$s = y_i y_j = \pm 1,$$

$$K_{mn} = K(\vec{x}_m, \vec{x}_n),$$

$$v_i = y_i \sum_{m \neq i,j} y_m K_{im} \alpha_m,$$

$$v_j = y_j \sum_{m \neq i,j} y_m K_{jm} \alpha_m,$$

and $W_{constant}$ are the terms that do not depend on $\alpha_i, \alpha_j$. Since $\alpha_i = \Delta - s\alpha_j$, the function W has the form $W(\alpha_j) = W^+(\alpha_j) + W^+(\alpha_j)$, where $$W(\alpha_j) =$$

$$-\frac{1}{2}(K_{ii}(\Delta - s\alpha_j)^2 + K_{jj}(\alpha_j)^2 + 2sK_{ij}\alpha_j(\Delta - s\alpha_j) + (\Delta - s\alpha_j)v_i + \alpha_j v_j) +$$

$$\Delta + (1-s)\alpha_j + W_{constant},$$

$$W^+(\alpha_j) = -\frac{1}{2\gamma}((\Delta - s\alpha_j + \beta_i - C)^2 + (\alpha_j + \beta_j - C)^2).$$

We now seek for the maximum $\alpha_j^{new}$ of the function $W(\alpha_j)$ on the segment $L \leq \alpha_j \leq H$, where boundaries L and H are defined jointly from the inequalities of the problem and the sign of s. We calculate the extreme point $\alpha_j^+$ of $W(\alpha_j)$ and the boundaries L and H for the following four different cases separately:

Case 1: $\alpha_i < C$; $\alpha_j < C$.
Case 2: $\alpha_i \geq C$; $\alpha_j \geq C$.
Case 3: $\alpha_i < C$; $\alpha_j \geq C$.
Case 4: $\alpha_i \geq C$; $\alpha_j < C$.

Case 1: $\alpha_i < C$; $\alpha_j < C$ In this case, the non-positive function $W+(\alpha_i, \alpha_j)$ reaches its maximum 0 for $\beta_i = C - \alpha_i$ and $\beta_j = C - \alpha_j$. Then $W(\alpha_i, \alpha_j) = W^+(\alpha_i, \alpha_j)$. The function W has zero derivative on $\alpha_j$ for $$\alpha_j^+ = \frac{1 - s + 2s\Delta(K_{ii} - K_{ij}) + sv_i - v_j}{2(K_{jj} - 2K_{ij} + K_{ii})}.$$

Figure 5:
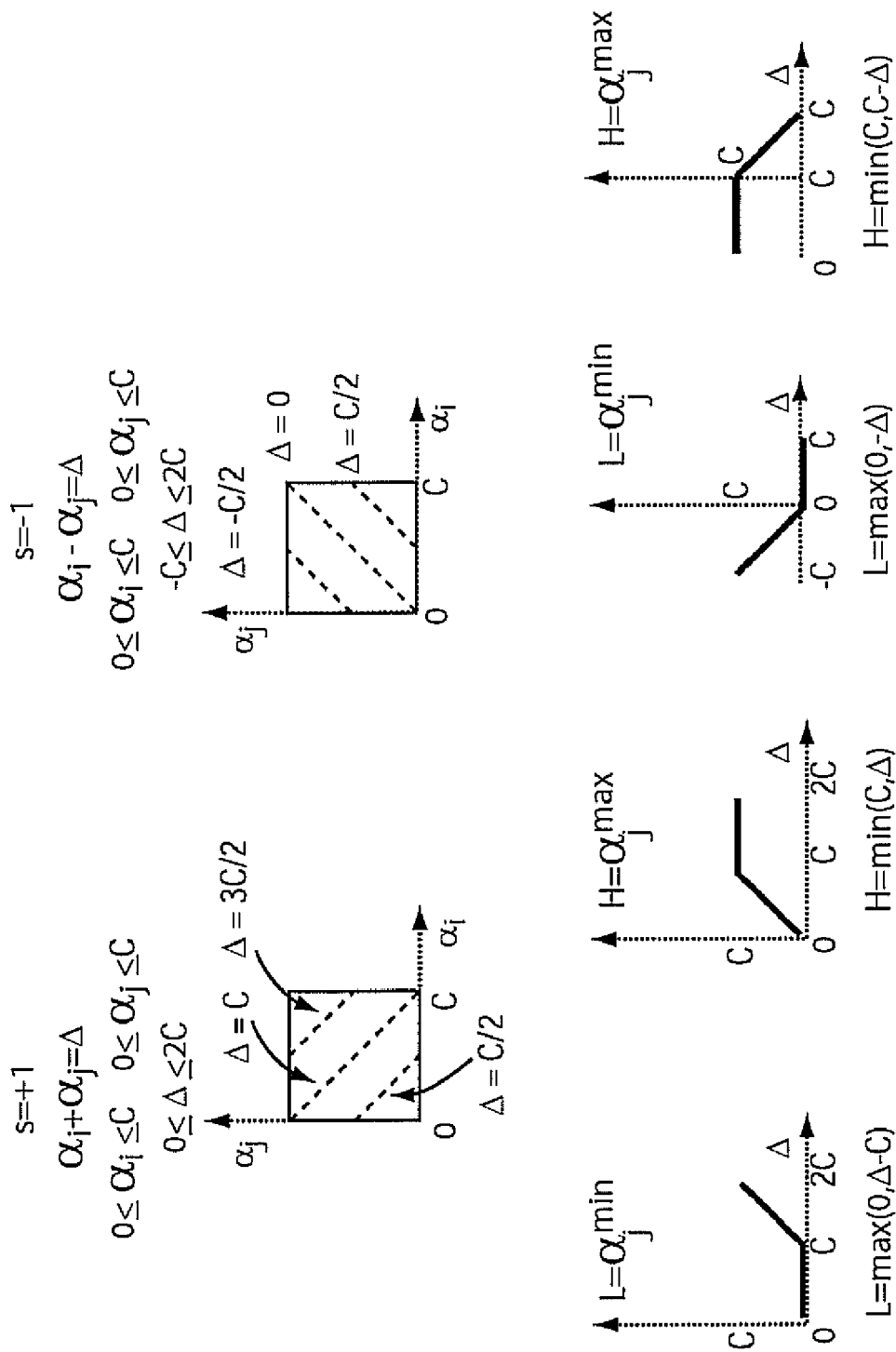
FIGS. 5-8 show low and high boundaries for $\alpha_j$ for cases 1-4, respectively.

Then, depending on s, as illustrated in FIG. 5, there are the following lower (L) and higher (H) boundaries for:
if s=+1 then L=max(0,Δ−C), H=min(C,Δ);
if s=−1 then L=max(0,−Δ), H=inn(C,C−Δ).

Case 2: $\alpha_i \geq C$; $\alpha_j \geq C$. In this case, the function $W+(\alpha_i, \alpha_j)$ reaches its maximum for $\beta_i = \beta_j = 0$. Then $$W(\alpha_i, \alpha_j) = W^+(\alpha_i, \alpha_j) - \frac{1}{2\gamma}((\alpha_i - C)^2 + (\alpha_j - C)^2).$$

Therefore, $$W(\alpha_i, \alpha_j) =$$

$$\alpha_i + \alpha_j - \frac{1}{2}(K_{ii}^{++}\alpha_i^2 + K_{jj}^{++}\alpha_j^2 + 2sK_{ij}^{++}\alpha_i\alpha_j + \alpha_i v_i^{++} + \alpha_j v_j^{++}) + W_{constant},$$

where $$K_{ii}^{++} = K_{ii} + \frac{1}{2\gamma}, K_{jj}^{++} = K_{jj} + \frac{1}{2\gamma},$$

$$K_{ij}^{++} = K_{ij}, v_i^{++} = v_i - \frac{C}{\gamma}, v_j^{++} = v_j - \frac{C}{\gamma}.$$

Denote $y_i\alpha_i + y_j\alpha_j = \delta$ and multiply this equality by $y_i$: $\alpha_i + \alpha_j s = \Delta$ where $\Delta = \delta y_i$ and $s = \pm 1$. The function W has zero derivative on $\alpha_j$ for $$\alpha_j^+ = \frac{1 - s + 2s\Delta(K_{ii}^{++} - K_{ij}^{++}) + sv_i^{++} - v_j^{++}}{2(K_{jj}^{++} - 2K_{ij}^{++} + K_{ii}^{++})}.$$

Figure 6:
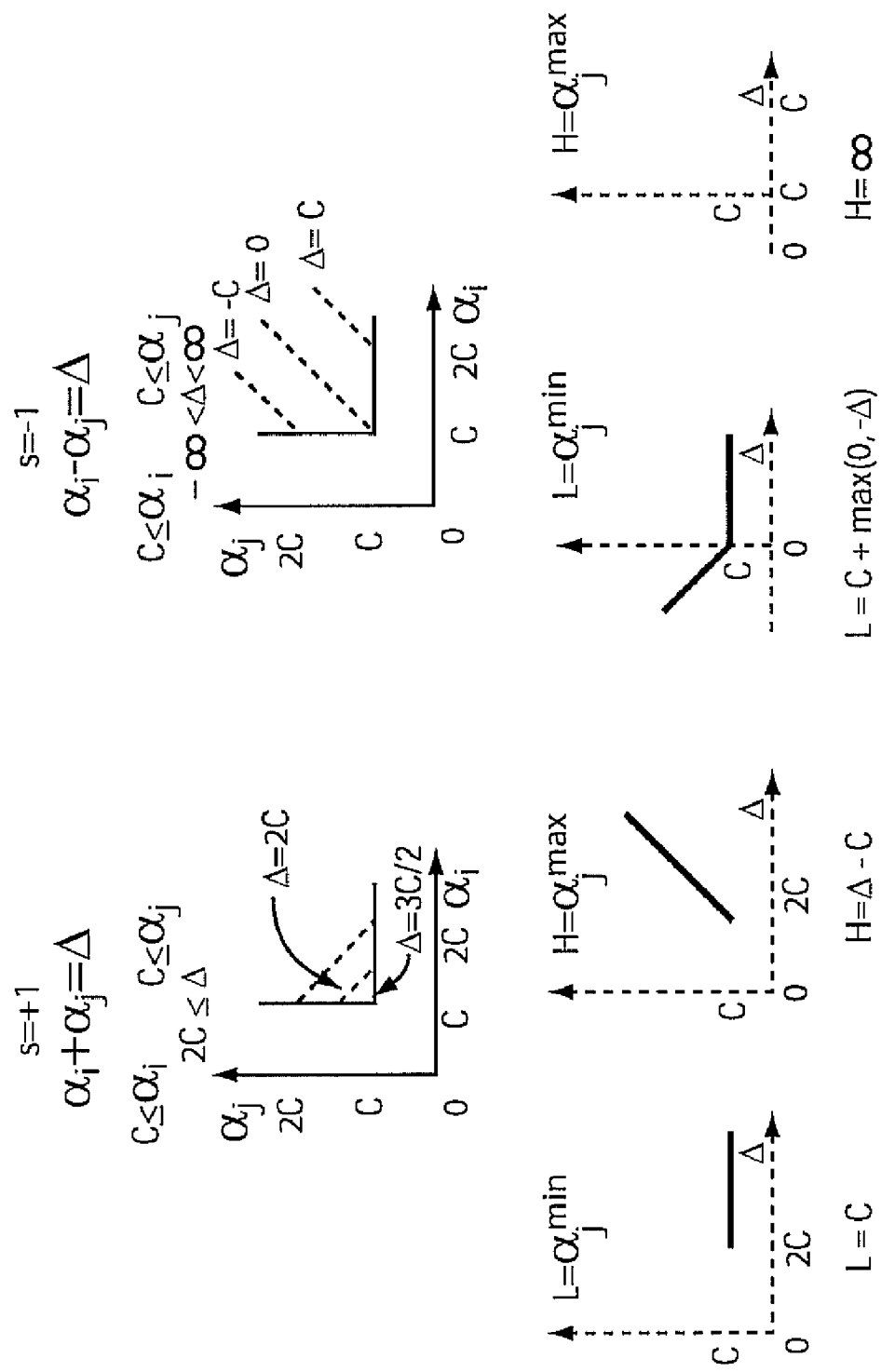

Then, depending on s, as illustrated in FIG. 6, there are the following lower (L) and higher (H) boundaries for $\alpha_j$:
  if $s=+1$ then $L=C$, $H=\Delta-C$;
  if $s=-1$ then $L=C+\max(0,-\Delta)$, $H=+\infty$.
Case 3: $\alpha_i < C$; $\alpha_j \geq C$. In this case, the function $W^+(\alpha_i, \alpha_j)$ reaches its maximum for $\beta_i = C - \alpha_i$ and $\beta_j = 0$. Then, $$W(\alpha_i, \alpha_j) = W^+(\alpha_i, \alpha_j) - \frac{1}{2\gamma}(\alpha_j - C)^2.$$

Therefore, $$W(\alpha_i, \alpha_j) =$$

$$\alpha_i + \alpha_j - \frac{1}{2}(K_{ii}^{++}\alpha_i^2 + K_{jj}^{++}\alpha_j^2 + 2sK_{ij}^{++}\alpha_i\alpha_j + \alpha_i v_i^{++} + \alpha_j v_j^{++}) + W_{constant},$$

where $$K_{ii}^{++} = K_{ii}, K_{jj}^{++} = K_{jj} + \frac{1}{2\gamma},$$

$$K_{ij}^{++} = K_{ij}, v_i^{++} = v_i, v_j^{++} = v_j - \frac{C}{\gamma}.$$

Denote $y_i\alpha_i + y_j\alpha_j = \delta$ and multiply this equality by $y_i$: $\alpha_i + \alpha_j s = \Delta$ where $\Delta = \delta y_i$ and $s = \pm 1$. The function W has zero derivative on $\alpha_j$ for $$\alpha_j^+ = \frac{1 - s + 2s\Delta(K_{ii}^{++} - K_{ij}^{++}) + sv_i^{++} - v_j^{++}}{2(K_{jj}^{++} - 2K_{ij}^{++} + K_{ii}^{++})}.$$

Figure 7:
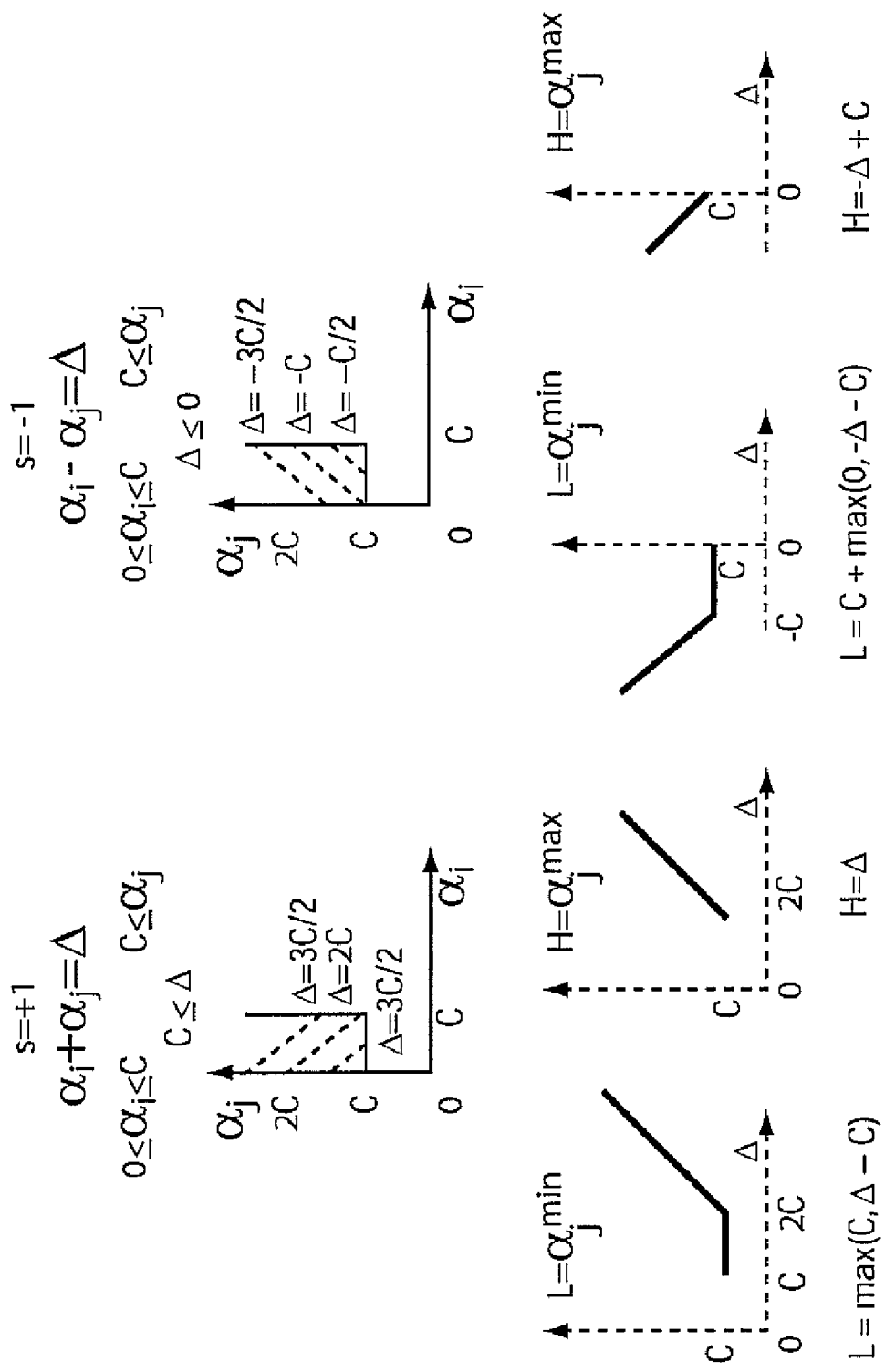

Then, depending on s, as illustrated in FIG. 7, there are the following lower (L) and higher (H) boundaries for $\alpha_j$:
  if $s=+1$ then $L=\max(C,\Delta-C)$, $H=\Delta$;
  if $s=-1$ then $L=C+\max(0,-\Delta-C)$, $H=-\Delta C$.
Case 4: $\alpha_i \geq C$; $\alpha_j < C$. In this case, the function $W^+(\alpha_i, \alpha_j)$ reaches its maximum for $\beta_j = C - \alpha_j$ and $\beta_i = 0$. Then, $$W(\alpha_i, \alpha_j) = W^+(\alpha_i, \alpha_j) - \frac{1}{2\gamma}(\alpha_i - C)^2.$$

Therefore, $$W(\alpha_i, \alpha_j) =$$

$$\alpha_i + \alpha_j - \frac{1}{2}(K_{ii}^{++}\alpha_i^2 + K_{jj}^{++}\alpha_j^2 + 2sK_{ij}^{++}\alpha_i\alpha_j + \alpha_i v_i^{++} + \alpha_j v_j^{++}) + W_{constant},$$

where $$K_{ii}^{++} = K_{ii} + \frac{1}{2\gamma}, K_{jj}^{++} = K_{jj},$$

$$K_{ij}^{++} = K_{ij}, v_i^{++} = v_i - \frac{C}{\gamma}, v_j^{++} = v_j.$$

Denote $y_i\alpha_i + y_j\alpha_j = \delta$ and multiply this equality by $y_i$: $\alpha_i + \alpha_j s = \Delta$, where $\Delta = \delta y_i$ and $s = \pm 1$. The function TV has zero derivative on $\alpha_j$ for $$\alpha_j^+ = \frac{1 - s + 2s\Delta(K_{ii}^{++} - K_{ij}^{++}) + sv_i^{++} - v_j^{++}}{2(K_{jj}^{++} - 2K_{ij}^{++} + K_{ii}^{++})}.$$

Figure 8:
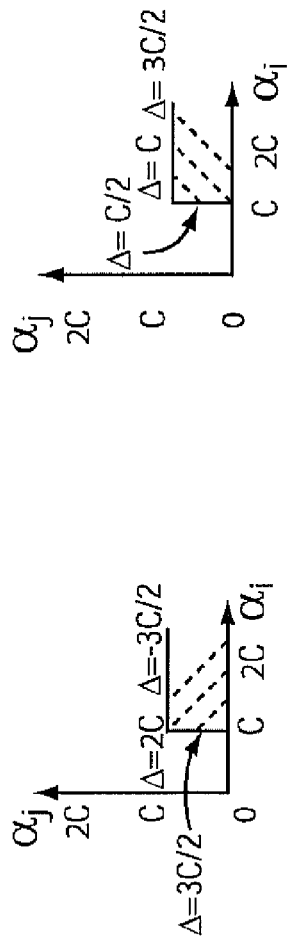
Figure 8:
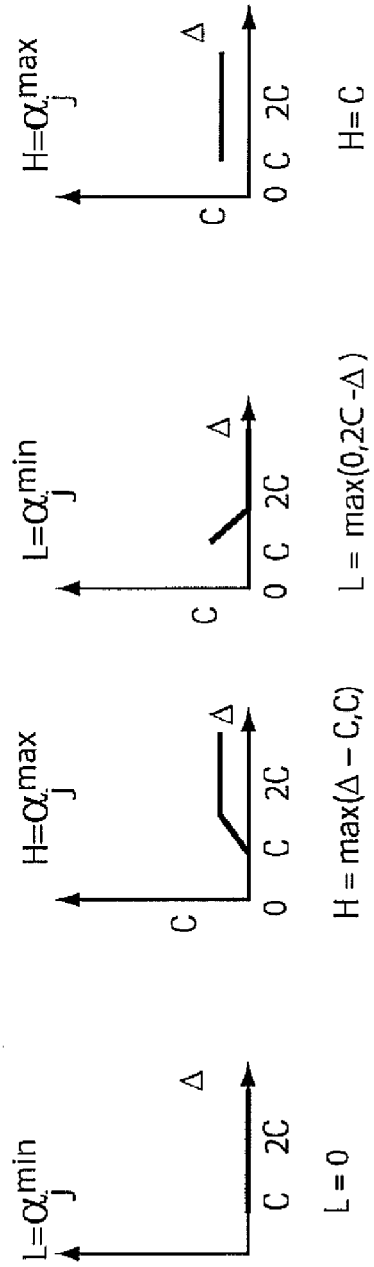

Then, depending on s, as illustrated in FIG. 8, there are the following lower (L) and higher (H) boundaries for $\alpha_j$:
  if $s=+1$ then $L=0$, $H=\min(\Delta-C,C)$;
  if $s=-1$ then $L=\max(0,2C-\Delta)$, $H=C$.
Now that we computed $\alpha_j^+$, L, and H for each of the four cases, we compute $\alpha_j^{new}$ in the following way:
  Case A: If $L \leq \alpha_j^+ \leq H$, then we select the maximum of the three values $W_0 = W(L)$, $W_+ = W(\alpha_j^+)$, $W_1 = W(H)$, and then select the corresponding values of $\alpha_j^{new}$: $\alpha_j^{new} = L$, $\alpha_j^{new} = \alpha_j^+$ or $\alpha_j^{new} = H$.
  Case B: If $L \leq \alpha_j^+ \leq H$ is not true, then we select the maximum of the two values $W_0 = W(L)$, $W_1 = W(H)$ and then select the corresponding values of $\alpha_j^{new}$: $\alpha_j^{new} = L$, or $\alpha_j^{new} = H$.
After that we compute $\alpha_i^{new}$ as $\alpha_i^{new} = \Delta - \alpha_j^{new} s$, which completes the step of computing two new Lagrange multipliers $\alpha_j^{new}$ and $\alpha_i^{new}$.

gSMO Complexity: As illustrated, generalized SMO (gSMO), is faster than generic quadratic optimization since it uses a closed-form computation. gSMO is thus applicable to SVM+ problems handling large samples in large-dimensional spaces. gSMO is specially designed for SVM+, whereas SMO is applicable for SVM. While SVM+ has twice as many variables as SVM, gSMO employs the same order of magnitude of computations of W as SMO. Indeed, SMO computes W once and then compares the extreme point with L and H; gSMO may need to compute W in two extreme points (corresponding to vertical and horizontal directions) and in three vertices of D).

The SVM+ approach provides a basis for better generalization (lower VC-dimension) and is a potential new setting of learning which includes a real teacher (not just an oracle). We have showed that SVM+ can perform better than SVM in terms of its error rate. We introduced a specialized optimization technique, SVM+, which appears to be as efficient as standard techniques for SVM. Additional optimization of gSMO (covering speed-up of individual steps, mechanisms for working set selection (including more than two working vectors), and parameters selection) is also contemplated. The realization of gSMO within the framework of standard SVM libraries is expected to bring more data for further improvement of the method.

Figure 9:
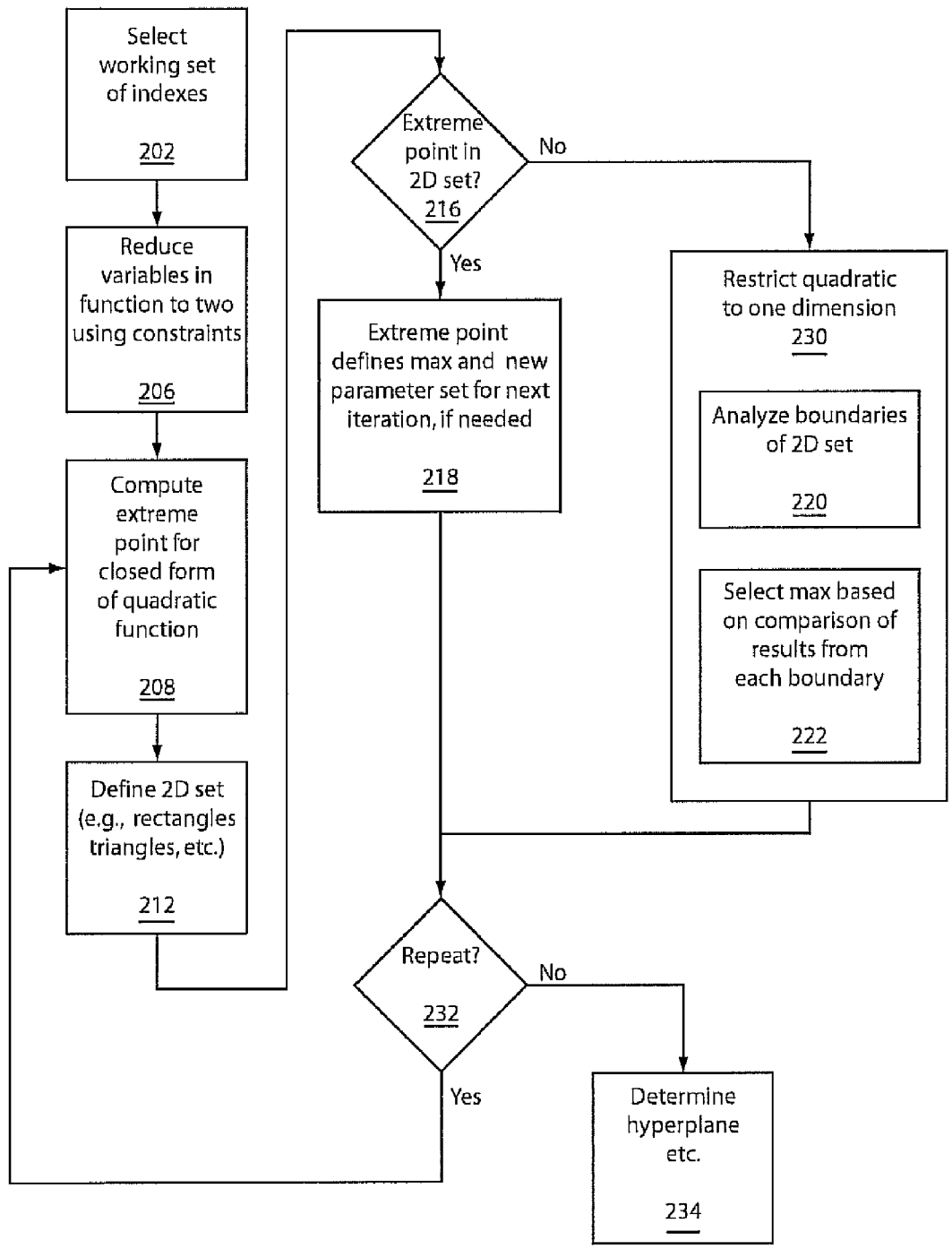
FIG. 9 is a block/flow diagram showing a system/method for a generalized Sequential Minimum Optimization (gSMO) in accordance with the present principles.

Referring to FIG. 9, a block/flow diagram showing a system/method for training a support vector machine plus (SVM+) using sequential maximizations illustratively shown. In block 202, a working set of indexes is selected for a target function to create a quadratic function depending on a number of variables. The working set is selected as the pair of examples whose Lagrange multipliers maximally violate the optimality conditions (e.g., Kharush-Kuhn-Tucker conditions). In one embodiment, selecting the working set of indexes includes selecting a pair of indexes and the number of variables is four.

In block 206, the number of variables is reduced to two variables in the quadratic function using linear constraints. In block 208, an extreme point is computed for the quadratic function in closed form. This may include computing zero derivatives for each of the two variables to determine the extreme point.

In block 212, a two-dimensional set is defined where the indexes determine whether a data point is in the two-dimensional set or not. The two-dimensional set may form/define a rectangle, a triangle or other the two-dimensional shape.

In block 216, a determination of whether the extreme point belongs to the two-dimensional set is made. If the extreme point belongs to the two-dimensional set, the extreme point defines a maximum and the extreme point defines a new set of parameters for a next iteration in block 218. The new set of parameters may include Lagrange multipliers.

Otherwise, the quadratic function is further restricted on at least one boundary of the two-dimensional set to create a one-dimensional quadratic function in block 230. This may include analyzing boundaries of the two-dimensional set in block 220 and selecting a maximum based upon a comparison of a result from each boundary in block 222.

The steps are preferably repeated until the maximum is determined in block 232. In block 234, the maximum may be employed as a determination of a maximum distance to a hyperplane.

Having described preferred embodiments of a system and method for generalized sequential minimal optimization for svm+ computations (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A computer implemented method for training a support vector machine plus (SVM+) using sequential maximization, comprising:
   selecting a working set of two indexes for a target function to create a quadratic function depending on a number of variables;
   reducing the number of variables to two variables in the quadratic function using linear constraints;
   computing an extreme point for the quadratic function in closed form;
   defining a two-dimensional set where the indexes determine whether a data point is in the two-dimensional set or not;
   determining whether the extreme point belongs to the two-dimensional set wherein:
   if the extreme point belongs to the two-dimensional set, the extreme point defines a maximum and the extreme point defines a new set of parameters for a next iteration, and
   otherwise, restricting the quadratic function on at least one boundary of the two-dimensional set to create a one-dimensional quadratic function; and
   repeating the steps until the maximum is determined.

2. The method as recited in claim 1, wherein selecting a working set of indexes includes selecting a pair of indexes and the number of variables is four.

3. The method as recited in claim 1, wherein computing an extreme point for the quadratic function in closed form includes computing zero derivatives for each of the two variables.

4. The method as recited in claim 1, wherein defining a two-dimensional set includes defining one of a rectangle and a triangle for the two-dimensional set.

5. The method as recited in claim 1, wherein the new set of parameters include Lagrange multipliers which maximally violate optimality conditions.

6. The method as recited in claim 1, wherein determining whether the extreme point belongs to the two-dimensional set further comprises:
   determining whether the extreme point is within the two-dimensional set by analyzing boundaries of the two-dimensional set; and
   selecting a maximum based upon a comparison of a result from each boundary.

7. The method as recited in claim 1, wherein the maximum is employed as a determination of a maximum distance to a hyperplane.

8. A non-transitory computer readable medium comprising a computer readable program for training a support vector machine plus (SVM+) using sequential maximization, wherein the computer readable program when executed on a computer causes the computer to perform the steps of: selecting a working set of indexes for a target function to create a quadratic function depending on a number of variables;
   reducing the number of variables to two variables in the quadratic function using linear constraints;
   computing an extreme point for the quadratic function in closed form;
   defining a two-dimensional set where the indexes determine whether a data point is in the two-dimensional set or not;
   determining whether the extreme point belongs to the two-dimensional set wherein:
   if the extreme point belongs to the two-dimensional set, the extreme point defines a maximum and the extreme point defines a new set of parameters, otherwise, restricting the quadratic function on at least one boundary of the two-dimensional set to create a one-dimensional quadratic function, and repeating the steps of computing until the maximum is determined.

9. The non-transitory computer readable medium as recited in claim 8, wherein selecting a working set of indexes includes electing a pair of indexes and the number of variable is four.

10. The non-transitory computer readable medium as recited in claim 8, wherein computing an extreme point for the quadratic function in closed form includes computing zero derivatives for each of the two variables.

11. The non-transitory computer readable medium as recited in claim 8, wherein defining a two-dimensional set includes defining one of a rectangle and a triangle for the two-dimensional set.

12. The non-transitory computer readable medium as recited in claim 8, wherein the new set of parameters include Lagrange multipliers.

13. The non-transitory computer readable medium as recited in claim 8, wherein determining whether the extreme point belongs to the two-dimensional set further comprises:
   determining whether the extreme point is within the two-dimensional set by analyzing boundaries of the two-dimensional set; and
   selecting a maximum based upon a comparison of a result from each boundary.

14. The non-transitory computer readable medium as recited in claim 8, wherein the maximum is employed as a determination of a maximum distance to a hyperplane.

* * * * *